April 14, 1936.  E. BOECKING  2,037,452
SLIPPAGE COMPENSATOR FOR SOUND UNITS
Filed Feb. 19, 1934   2 Sheets-Sheet 1
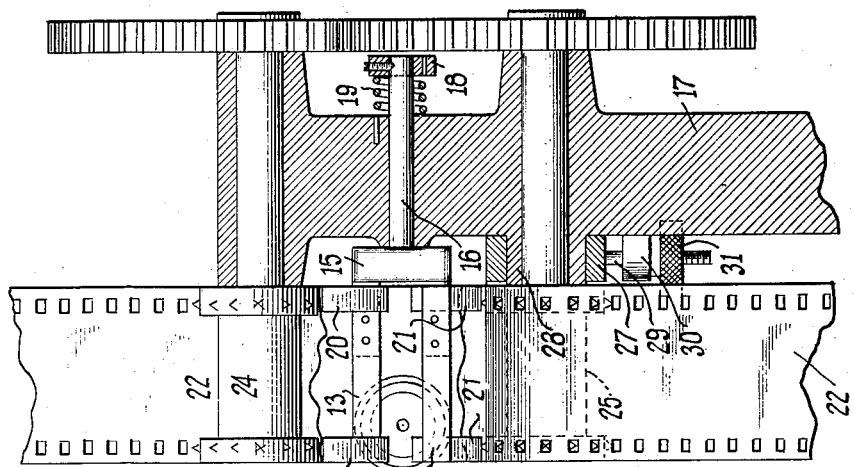
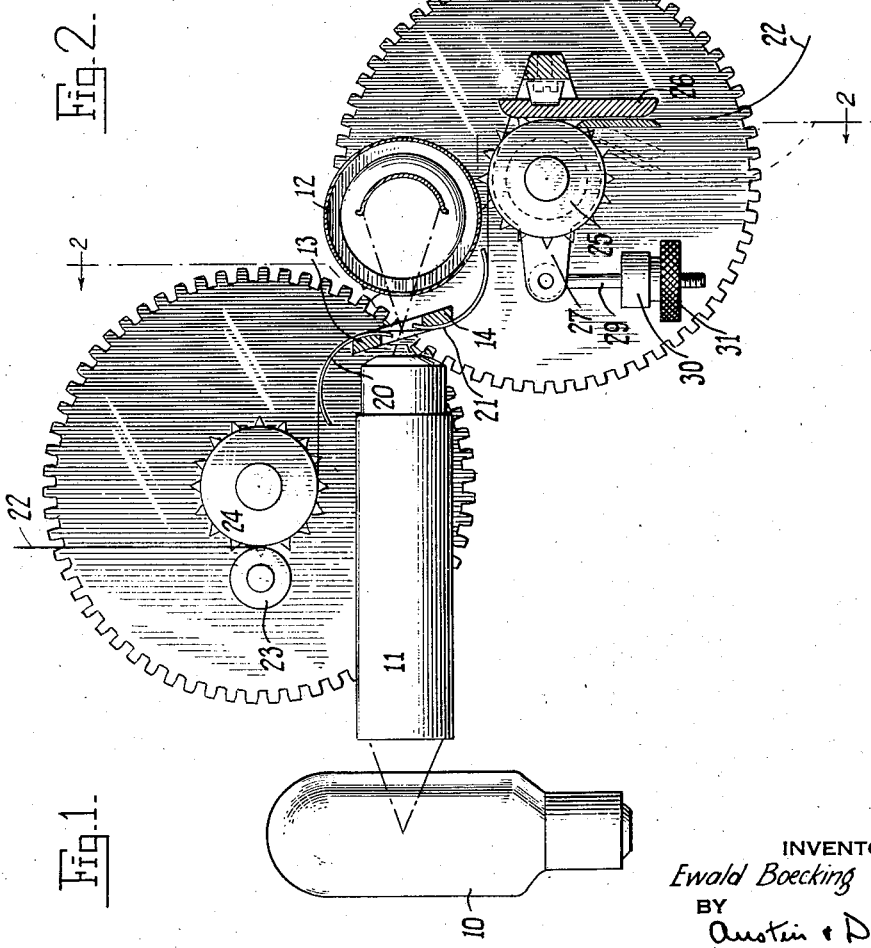
INVENTOR
Ewald Boecking
BY
Austin & Dix
ATTORNEYS.

April 14, 1936.  E. BOECKING  2,037,452
SLIPPAGE COMPENSATOR FOR SOUND UNITS
Filed Feb. 19, 1934  2 Sheets-Sheet 2
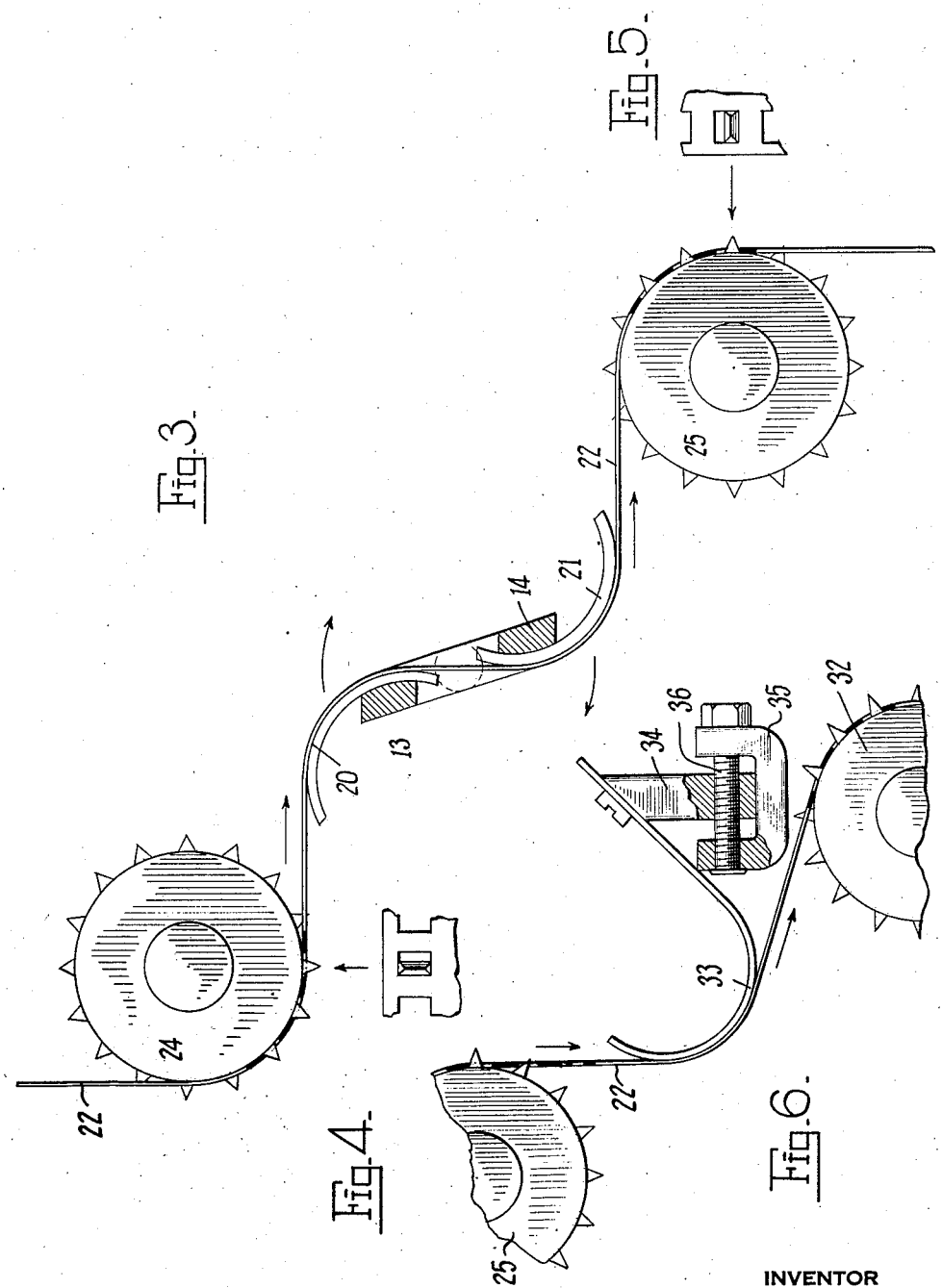
INVENTOR
Ewald Boecking
BY
Austin & Dix
ATTORNEYS.

Patented Apr. 14, 1936

2,037,452

UNITED STATES PATENT OFFICE 2,037,452

SLIPPAGE COMPENSATOR FOR SOUND UNITS

Ewald Boecking, Brooklyn, N. Y., assignor to International Projector Corporation, New York, N. Y., a corporation of Delaware Application February 19, 1934, Serial No. 711,999

2 Claims. (Cl. 271—2.3)

This invention relates to a simple and efficient device to be used for the purpose of regulating the directional and tensional condition of a film passing between driving elements such as sprockets and has particular reference to such a device when employed to regulate the tension and movement of a film passing through a motion picture projector which has a sound unit therein.

A main feature of the invention is to provide a simple, compact, and efficient mechanism whereby the film as it passes from one sprocket to another is regulated as to its tension and direction of movement so that irregular and jerky movements of the film are avoided, whereby in crossing a sound light beam in the unit, for instance, irregularities in the sound will not be produced.

A further feature is to provide a simple mechanism, economical to manufacture which has the broader application to the regulation of a film passing between sprockets, such as in a camera, a film printing machine or other similar device, where it is vital that the direction and position of the film, at least along part of its travel, shall remain and be maintained in a predetermined manner.

A still further feature is to provide a simple mechanism which will automatically keep the film in proper position and under constant tension irrespective of the tendency of the film to alter its position due to irregularities in the mechanical assemblage of the film driving sprockets or mechanisms as well as to differences in the spacing of the film sprocket holes.

Further and more specific features, objects, and advantages will more clearly appear from a consideration of the specification when taken in connection with the accompanying drawings which form part of the specification and which illustrate present preferred forms of the invention.

A general but brief contemplation of the invention discloses a pair of elements such as sprockets with which a film is engaged and by which it is moved therebetween. The field traversed by the film between these two driving elements is important only in that it is vital to regulate the tension and direction of movement of the film in it. This field may be in a projector, a camera, a printing machine, or other device. In the form shown in the drawings a motion picture projector is employed with a sound unit and it is the motion of the film between the two sprockets of the sound unit which is important in the selected instance. It is important because in this particular field the film crosses the sound light beam and any major variations of the position of the film in crossing the beam or any non-uniformity or jerk in its movement across the beam will detrimentally affect the sound produced. The driving sprockets are generally connected by gearing and in the mechanical assemblage which connects them there is likely to be a certain amount of looseness or back lash which might cause irregularity in film movement. There is also the factor that the film sprocket holes may slightly differ in size and in space relation which would cause the film to jerk or slip on the sprockets and cause irregular movement.

To overcome these factors causing irregular movement, which cannot be easily avoided in commercial production, a film-engaging plate is disposed to engage the film at a determined point between the two driving or moving elements. This point will be different depending upon what sort of machine is employing the invention, but in the form shown the point is that point where the film crosses the sound beam in the sound unit of a modern motion picture and sound projector. This plate is resiliently mounted so that it exerts a sort of double regulating action on the film to maintain its tension and motion across the beam in a substantially constant manner.

This regulating element or plate exerts a pull on the portion of the film coming from the one sprocket to the plate and also a similar pull on that portion of the film which extends from the plate to the second sprocket. As a consequence of this steady regulating tendency, the film is maintained in its proper position in its movement and jerky movement thereof is avoided, especially as it travels from one sprocket to the other. This regulation as it crosses the beam in the specific form shown, is important for the reasons mentioned above. This same sort of regulation between sprockets is equally vital and applicable with this invention as applied to many other devices and machines through which a film may be passed for other purposes than the projection of sound motion pictures as indicated above.

As shown in the drawings the present preferred forms of the invention are set forth as follows:—

Fig. 1 is a side view of part of the sound mechanism of the projector;

Fig. 2 is a vertical cross section thereof taken on the line 2—2 of Fig. 1;

Fig. 3 is an enlarged expanded semi-diagrammatic view of the manner in which the film is engaged by the pair of sprockets and the intermediate regulating plate;

Fig. 4 is a partial inverted elevational view of the engagement of the film by a tooth on the first or hold-back sprocket;

Fig. 5 is a partial side elevation of the engagement of the film by the other or driving sprocket; and, Fig. 6 is a view similar to Fig. 3, and shows a modified form of the invention.

As shown in the drawings, there is provided a lamp 10, a lens combination unit 11, and a photo-electric cell 12. Between the cell unit 12 and the lens combination unit 11 there is disposed an oscillatable film engaging plate or frame comprising spaced bars 13 and 14 connected at one end by a cross bar 15, supported on a shaft 16 journalled in a pedestal 17 forming part of the main frame of the projector. The end of the shaft 16 projects through and beyond the pedestal 17, and carries on its outer end a collar 18. A spring 19 is coiled around the end of the shaft 16 and is disposed between the collar 18 and the adjacent face of the pedestal 17. One end of the spring 19 is fastened to the pedestal and the other end to the collar 18. The tendency of the spring 19 is to turn the film-engaging plate or frame in the direction as indicated by the arrows in Figs. 1 and 3.

The spaced bars 13 and 14 forming the film-engaging frame or plate are, on their respective ends, provided with curved spring plates or guide members 20 and 21 as shown which extend outwardly in a curved manner from the respective bars and provide curved guides for the film and lead the film toward and away from the plate or frame as shown in Figs. 1 and 3. The film 22, see Fig. 1, passes downwardly between a roller and the hold-back sprocket 24, thence over the guide spring plate 20, down between the bars 13 and 14, and then around and over the guide spring plate 21. Thence it passes between the drive sprocket 25 and a presser plate 26, whence it continues through the apparatus in any usual and desired manner. The hold-back sprocket 24 actually engages the film by means of the teeth thereon and positively assists in moving the film through the machine whereby it functions more than as a mere idler roller would.

Considering Fig. 3, it will be seen that the action of the regulating and film-engaging element or plate disposed between the sprockets 24 and 25 is to pull the two portions of the film in opposite directions. The upper end of the plate pulls the film in a direction to the right and the lower portion of the plate pulls the film in a direction toward the left. It will thus be seen that this tendency of the regulating and tensioning plate is to keep the film so disposed on the sprockets 24 and 25 that the teeth of the sprockets always engage the film sprocket holes firmly and snugly so that any tendency of the film to slip due to back lash in the mechanism or non-uniformity of the holes is instantly corrected and compensated for. As will be seen in Fig. 4 the tooth engaging the hole on the sprocket 24 is always bearing against the back of the hole due to the pulling action of the regulating plate, and in Fig. 5 it will be seen that the tooth on the sprocket 25 is also always engaging the front edge of the hole due to the similar pull of the regulating plate thereon in the opposite direction.

The presser plate 26 is mounted on an oscillatable frame 27 journalled on a hub 28 extending from the frame 17. A bar 29 pivoted to the end of the frame 27 passes through a boss 30 and has a threaded lower end with which a screw nut 31 engages so that the angular position of the frame 27 and consequently the position of the presser plate 26 with respect to the sprocket 25 can be adjusted. This provision will permit the presser plate to be adjusted at assembly or afterwards so that the departure of the film from the sprocket 25 can be varied dependent upon the particular film used, the sprocket hole spacing, and the back lash conditions found with the particular assembly employed. This will enable the operator to locate the film as shown in Fig. 3 so that at least one tooth on the drive sprocket 25 will be engaged as shown with the film. Which tooth is in engagement to pull depends upon the various variable factors previously mentioned. He likewise can engage the film holes properly with respect to the teeth on the hold-back sprocket 24 in the same manner.

As shown in Fig. 6, the film after leaving the driving sprocket 25 may pass beneath a curved spring 33 and then to another sprocket 32. This spring is adjustable on a slide pedestal or element 34 mounted adjustably on a screw 36 turnable in a support 35. Therefore the direction with which the film may leave the sprocket 25 can be adjusted by moving the position of the spring 33 as shown. This is a modification of the means whereby the point of departure of the film from the drive sprocket can be adjusted.

The regulating frame formed by the bars 13 and 14 may be considered as an oscillatable support, apertured, and having a leading edge on the bar 13 and a trailing edge on the bar 14. This frame or element tensions the film received between the bars and pulls on it in opposite directions for the purposes mentioned. It is adjusted by reason of the spring 19 to maintain the film movement in a substantially constant direction as the film passes across the light beam. It is obvious that this tensioning and direction regulation may be with respect to other elements than the light beam here shown as may be required in other machines in which the invention may be employed for similar film regulating purposes.

It will therefore be seen that this invention provides a simple and efficient means whereby the film as it passes by a given portion of its path, such as the light beam, is kept in proper directional position with respect to this portion of its path and that any slight tendencies of the film to jerk or slip are instantly taken up by the resiliently mounted oscillatable plate or frame. After the film has been adjusted to the sprockets with the teeth engaging as shown in Figs. 4 and 5, then the entire action thereafter is taken care of by the action of the regulating frame to pull the film in opposite directions at all times and instantly to take up any jerk or slip that may tend to occur due to the factors previously mentioned. After the film has been disposed on the parts with proper respect for the hole arrangement and spacing, then the presser plate 26 or its modification can be adjusted to give the desired angle of departure to the film.

It is clearly apparent that this same device can be used in other machines than the one shown. In any machine where a film passes through it may be desirable to positively engage a film on opposite sides of a given point in its travel between two sprockets or similar feeding means to positively move it and then provide a definite regulating such as the regulating plate or frame shown for determining its directional and tensional condition in this part of its path between the sprockets.

While the invention has been described in detail and with respect to present preferred forms thereof, it is not to be limited to such details and forms since many changes and modifications may be made in the invention without departing from the spirit and scope of the invention in its broadest aspects. Hence it is desired to cover any and all forms and modifications of the invention which may come within the language or scope of any one or more of the appended claims.

I claim:

1. In apparatus of the character described for recording, printing or reproducing sound, wherein a film is passed through a beam of light, a sprocket on one side of said beam for assisting in controlling the rate of feed of said film past the beam, a sprocket on the opposite side of said beam for drawing the film forward at a controlled rate, and means constructed and arranged to frictionally and resiliently engage said film adjacent the opposite edges of the beam for pulling the portion of the film in the beam forward from the first sprocket and rearward from the second sprocket and for guiding said portion of the film into a plane substantially perpendicular to the beam, said film portion being completely free from engagement, between the effective edges of the beam.

2. In apparatus of the character described for recording, printing or reproducing sound, wherein a film is passed through a beam of light, a sprocket on one side of said beam for assisting in controlling the rate of feed of said film past the beam, a sprocket on the opposite side of said beam for drawing the film forward at a controlled rate, and means constructed and arranged to frictionally and resiliently engage said film adjacent the opposite edges of the beam for pulling the portion of the film in the beam forward from the first sprocket and rearward from the second sprocket and for guiding said portion of the film into a plane substantially perpendicular to the beam, said film portion being completely free from engagement, between the effective edges of the beam, and said means comprising a pair of diametrically opposed curvilinear elements adapted to engage opposite sides of the film and being mounted on a pivot, and a resilient device adapted to rotate said elements about the pivot.

EWALD BOECKING.